Patented Apr. 29, 1947

2,419,628

UNITED STATES PATENT OFFICE 2,419,628

PROCESS FOR CHILLPROOFING AND STABILIZING WINE, GRAPE JUICE, AND OTHER FRUIT JUICES

Monroe J. Cohen, Brooklyn, N. Y., assignor to Monarch Wine Company, Inc., Brooklyn, N. Y., a corporation of New York No Drawing. Application June 6, 1942,
Serial No. 446,134

5 Claims. (Cl. 99—35)

The instant invention relates to the chillproofing and stabilizing of wine, grape juice and other fruit juices and the like by rendering same proof against tartrate precipitation and immune to infection by yeasts and/or other microorganisms.

One of the primary objects of the invention is, therefore, the treatment of wines, grape juice and similar beverages in a simple and efficient manner to accomplish the results set out above.

As is well known, any wine or grape juice or other juices containing an appreciable quantity of cream of tartar will cloud or deposit a tartrate sediment upon prolonged standing or upon subjection to temperatures below 60° Fahrenheit. Accordingly, it is the principal object of the instant invention to treat the aforementioned beverages in a manner to be hereinafter fully described so that these will remain clear and free of tartrate sediment even after prolonged subjection to extremely low temperatures. The need for removal of excess tartrates by means of prolonged refrigeration is thus eliminated. Finally, loss of a considerable portion of the valuable tartrate components from the wine or juice is thereby also prevented.

Wines and grape juice, unless preserved chemically or otherwise, are prone to attack by yeasts and/or micro-organisms. In the practice of the present invention, certain cations are eliminated from the beverages being treated, said cations being essential to the metabolism of or subjected to fermentation by yeasts or other micro-organisms. The various micro-organisms are, therefore, incapable of growth, multiplication or fermentation in wines or juices treated according to the instant invention. Consequently, the need for chemical preservatives or for pasteurization in sealed containers for marketing is eliminated.

The basis of the instant invention is that of cation exchange by means of a salt and acid regenerated carbonaceous zeolite. As illustrative of a carbonaceous zeolite attention is directed to U. S. Patents Nos. 2,170,065 and 2,260,971.

By employing zeolites such as disclosed in the aforementioned patents, the cream of tartar in the wine or juice is converted to a sodium acid tartrate—a more soluble form of acid tartrate than the corresponding potassium salt; the reaction taking place may be written as follows:

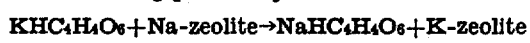

The first step in the practice of the process is the careful regeneration of a carbonaceous zeolite:

A bed of carbonaceous zeolite, packed in a suitable apparatus to a depth of approximately two and one-half feet is regenerated in the following manner:

An aqueous solution is prepared, containing 15% of sodium chloride (or other suitable salt) and enough sulfuric acid (or other suitable acid) to adjust the solution to approximately the same acidity as the wine or juice to be treated. The mixture thus obtained is allowed to flow downward through the bed of zeolite.

Regeneration is complete when no potassium ions can be detected in the effluent regenerant. In general, about one and one-half to three times the volume of the bed is the amount of regenerant mixture required for a complete regeneration. Fresh clean water is next allowed to pass through the bed until the effluent wash is free of chloride ions.

The wine or grape juice to be treated is then allowed to pass through the bed until the effluent wine or juice begins to show traces of cream of tartar or of potassium ions. At this point the zeolite bed must be regenerated, as above, before it can be used to treat more of the wine or juice. The entire cycle can be repeated an indefinite number of times on the same bed of material. By regulating the acidity of the regenerant it is possible to obtain an effluent wine or juice of desired acid content.

From the above it will be appreciated that the objects of the invention have been fully attained and what I claim and desire to secure by Letters Patent is:

1. The method of stabilizing wine and grape juice containing potassium tartrate by the elimination of the potassium cations from the tartrates in said beverages which comprises treating the beverage with a regenerated sodium zeolite until the potassium ions in the treated beverage have been all converted to sodium ions.

2. The method of stabilizing wine and grape juice containing potassium cations which comprises taking a bed of regenerated sodium zeolite and then passing the beverage therethrough until the effluent beverage begins to show traces of potassium ions.

3. The method of converting the cream of tartar in wine and grape juice to a more soluble form of tartrate which comprises passing the beverage through a bed of sodium zeolite as long as the effluent beverage shows exchange of sodium for potassium ions.

4. The method of improving wine and grape juice, containing potassium cations prone to attack by micro-organisms, comprising taking a bed of regenerated sodium zeolite and continuously passing the beverage therethrough until the effluent beverage begins to show traces of potassium ions.

5. The method of improving wine, grape juice, fruit juices and similar beverages containing potassium tartrate prone to attack by micro-organisms, and which will deposit tartrate sediment upon prolonged standing or subjection to low temperatures which comprises treating the beverage with a regenerated sodium zeolite until potassium ions in the treated beverage have been all converted to sodium ions.

MONROE J. COHEN.

REFERENCES CITED

The following references are of record in the file of this patent:

UNITED STATES PATENTS

| Number | Name | Date |
|---|---|---|
| 2,258,216 | Ramage | Oct. 7, 1941 |

FOREIGN PATENTS

| Number | Country | Date |
|---|---|---|
| 456,075 | British | Nov. 3, 1936 |

Certificate of Correction

Patent No. 2,419,628. April 29, 1947.

MONROE J. COHEN

It is hereby certified that the above numbered patent was erroneously issued to "Monroe J. Cohen, of Brooklyn, New York, assignor to Monarch Wine Company, Inc., of Brooklyn, New York, a corporation of New York," whereas said patent should have issued to *Monroe J. Cohen, of Brooklyn, New York, now by judicial change of name Monroe J. Coven, assignor to Monarch Wine Company, Inc., of Brooklyn, New York, a corporation of New York,*; and that the said Letters Patent should be read with this correction therein that the same may conform to the record of the case in the Patent Office.

Signed and sealed this 13th day of May, A. D. 1947.

[SEAL]

LESLIE FRAZER,
*First Assistant Commissioner of Patents.*

4. The method of improving wine and grape juice, containing potassium cations prone to attack by micro-organisms, comprising taking a bed of regenerated sodium zeolite and continuously passing the beverage therethrough until the effluent beverage begins to show traces of potassium ions.

5. The method of improving wine, grape juice, fruit juices and similar beverages containing potassium tartrate prone to attack by micro-organisms, and which will deposit tartrate sediment upon prolonged standing or subjection to low temperatures which comprises treating the beverage with a regenerated sodium zeolite until potassium ions in the treated beverage have been all converted to sodium ions.

MONROE J. COHEN.

REFERENCES CITED

The following references are of record in the file of this patent:

UNITED STATES PATENTS

| Number | Name | Date |
|---|---|---|
| 2,258,216 | Ramage | Oct. 7, 1941 |

FOREIGN PATENTS

| Number | Country | Date |
|---|---|---|
| 456,075 | British | Nov. 3, 1936 |

Certificate of Correction

Patent No. 2,419,628.    April 29, 1947.

MONROE J. COHEN

It is hereby certified that the above numbered patent was erroneously issued to "Monroe J. Cohen, of Brooklyn, New York, assignor to Monarch Wine Company, Inc., of Brooklyn, New York, a corporation of New York," whereas said patent should have issued to *Monroe J. Cohen, of Brooklyn, New York, now by judicial change of name Monroe J. Coven, assignor to Monarch Wine Company, Inc., of Brooklyn, New York, a corporation of New York,*; and that the said Letters Patent should be read with this correction therein that the same may conform to the record of the case in the Patent Office.

Signed and sealed this 13th day of May, A. D. 1947.

[SEAL]

LESLIE FRAZER,
*First Assistant Commissioner of Patents.*